UNITED STATES PATENT OFFICE.

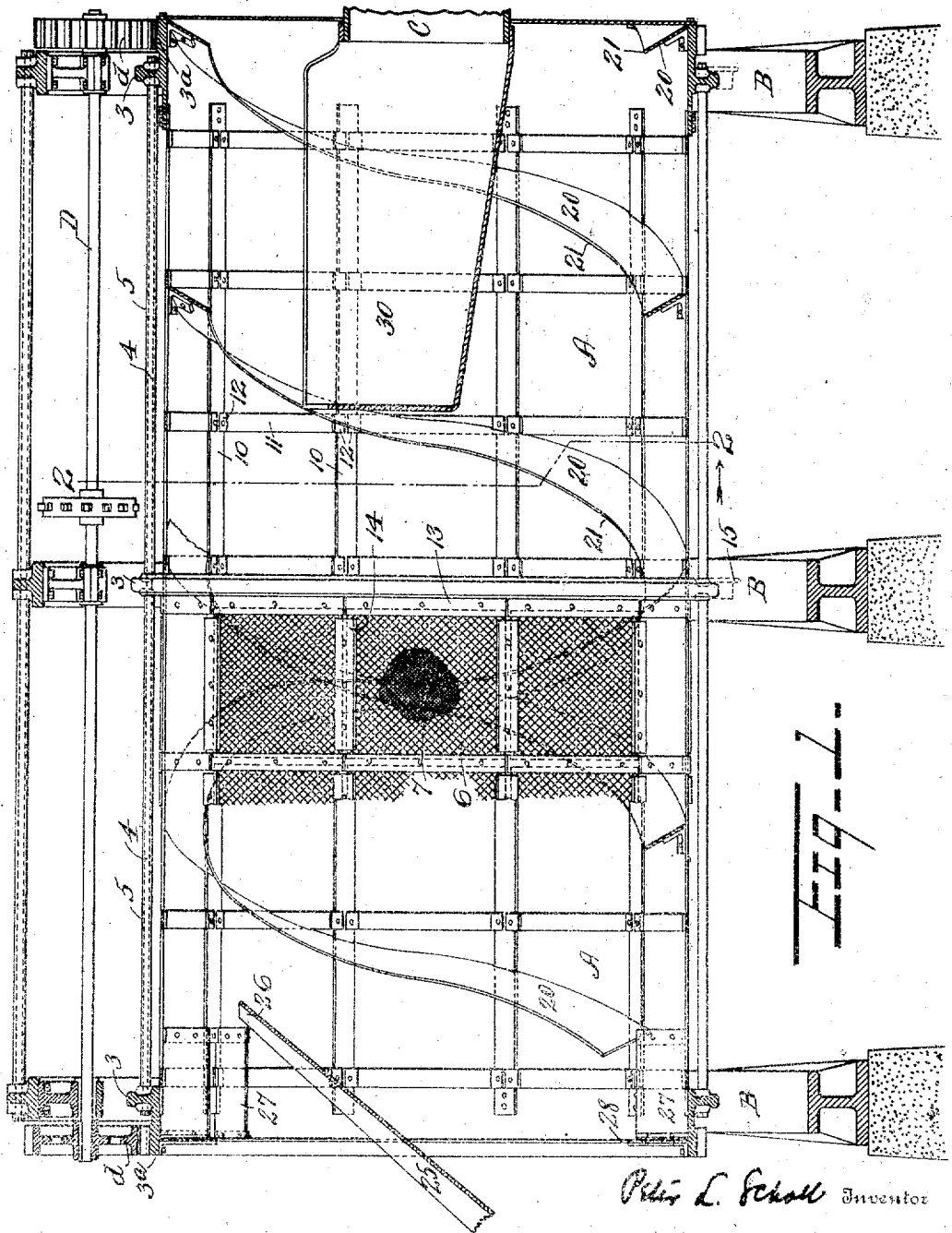

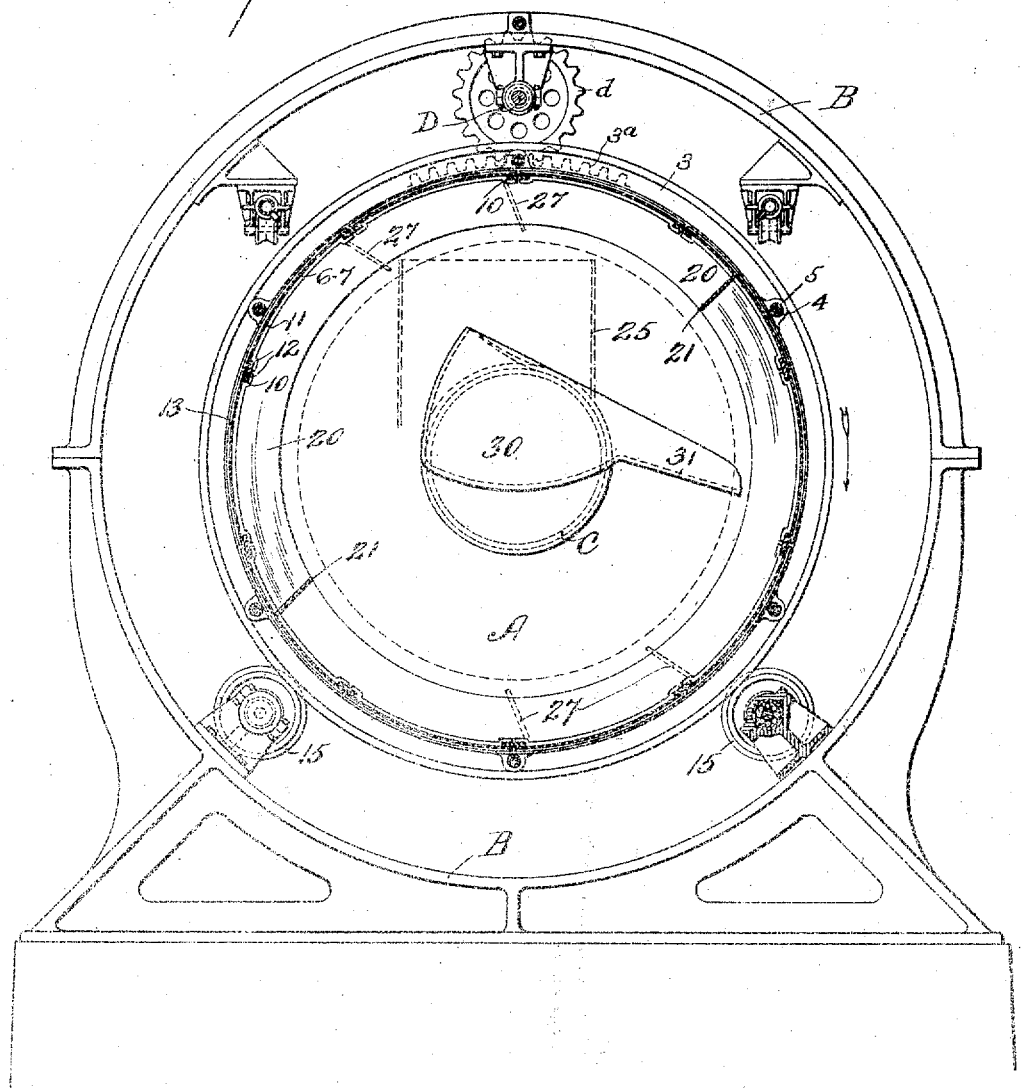

PETER L. SCHOLL, OF READING, PENNSYLVANIA, ASSIGNOR TO OLIVER M. WEAND, OF READING, PENNSYLVANIA.

ROTARY SCREEN MECHANISM.

962,168.  Specification of Letters Patent.  Patented June 21, 1910.

Application filed June 4, 1909. Serial No. 500,194.

*To all whom it may concern:*

Be it known that I, PETER L. SCHOLL, a citizen of the United States, and a resident of the city of Reading, in the county of Berks and State of Pennsylvania, have invented certain new and useful Improvements in Rotary Screen Mechanism, of which the following is a specification.

My invention relates to rotary screen mechanism adapted more particularly for separating the semi-solid matter in sewage from the liquid preliminary to requisite treatment of the latter.

The main objects of the invention are first to provide for more quickly and satisfactorily effecting such separation and the conveyance and delivery of the non-fluid matter; second for more equally and effectively utilizing the portion of the screen forward of the inlet conduit; third for utilizing the force of the inflowing stream in cleaning and operating the screen; and fourth for improving the skeleton structure of the screen and facilitating the application and renewal of the peripheral screening-fabric. The improved construction whereby these several objects are attained is fully described in connection with the accompanying drawings and the novel features thereof are specifically pointed out in the claims.

Figure 1 is a sectional elevation of a rotary screen mechanism embodying my several improvements in preferred form; a small part only of the screen being shown in full elevation with several of the screening sections clamped to the skeleton frame. Fig. 2 is a cross-sectional view on the line 2—2 of Fig. 1 looking in the direction of the arrow; the elevator buckets and fixed chute provided at the exit end of the screen as shown in Fig. 1 being indicated however in dotted lines.

The general form and mounting of the rotary screen A is similar to that shown in Patent No. 869,720, issued October 29th, 1907; the same comprising a series of exterior rings 3, 3, 3, which are connected in properly spaced relation by a circular series of exterior longitudinal tie bars 4, 4, having spacing tubes 5, 5, strung thereon between said rings; and a cylindrical screening wall made up of an outer netting 6 of relatively heavy wire and large mesh and a finer interior screen lining 7, applied in sections to the skeleton screen-frame; and the latter being rotatively carried in fixed housing-rings B B B arranged concentric with the screen rings 3, 3, 3, and provided with suitably mounted and spaced supporting rollers 15 upon which said screen rings ride. The material to be screened is supplied by a fixed conduit C which enters the open inlet end of the screen, and rotary motion is imparted to the latter through a suitable driving mechanism comprising, as shown, a drive shaft D having gear wheels $d$ meshing with the toothed periphery $3^a$ of the end rings 3.

In my improved construction the skeleton frame of the screen is formed, in connection with the spaced track-rings 3, 3, 3, by a series of circumferentially-spaced longitudinal ribs 10 secured to said track-rings, and an intersecting series of longitudinally-spaced frame-rings each of which, as shown, is made up of a series of curved sections 11, the ends 12 of which are rigidly secured to the intersecting longitudinal ribs, and the intermediate portions of which, extending between said ribs, are made flush exteriorly with the latter, as clearly shown in Fig. 2. The reinforcing netting 6 and finer screen lining 7 are jointly applied to this skeleton frame in separate composite sections of rectangular form, each of said sections being laid exteriorly upon said frame with the marginal portions thereof overlapping and bearing upon said ribs 10 and ring sections 11 respectively, and being clamped thereto by removably secured exterior clamping ring-sections 13 and rib sections 14. Each section of the screening thus applied permits of convenient renewal or repairs as required independently of the other portions.

An important object of my invention is to provide for more quickly and effectively separating and delivering the sludge or other non-fluid matter which is retained in the screen by the finer mesh 7. To this end I provide conveyer means for such non-fluid matter, carried by the rotary screen and consisting, as shown, of an inwardly-extending blade or blades 20 fixed to the inner periphery or screen wall thereof so as to form a helical vane or feed-worm; the action of which during rotation of the screen, upon such non-fluid matter, is to move the latter toward the exit end of the screen by constantly raising it in the direction of rotation upon the forwardly pitched surface of the vane. As shown two continuous parallel vanes are provided, forming a double worm of considerable pitch; the number and pitch of the vanes required to attain the best results in particular cases being determined however by the character of the material treated, the size and speed of rotation of the screen &c. The outer edges of the vane blades 20, as shown, lie close to the screen wall, while the inner edges 21 are elevated in the direction of rotation above the radial line so as to form a shallow carrier-trough for the sludge, whereby the latter is retained upon the rising vanes while constantly falling thereon so as to be conveyed to the exit end of the screen. The rigid connection of these vane blades to the skeleton frame of the screen serves the further purpose of greatly strengthening the latter.

In the construction shown, instead of discharging the sludge directly from the terminus of the vanes I provide for delivering the same to a fixed chute 25, the upper end 26 of which extends into the open exit end of the screen while its lower end is arranged to deliver to any conveniently located receptacle. To deliver the sludge conveyed by the vanes, to this fixed chute, I provide buckets 27 on the exit end of the screen, projecting interiorly from a circular flange or baffle ring 28, and so located as to catch the sludge falling from the ends of the vane blades; said buckets being adapted, as the screen rotates, to carry upward the sludge thus received and to dump it into the chute 25 as they are carried above the end 26 of the latter.

The manner of delivering the inflowing stream of sewage or the like from the fixed conduit C to the rotary screen, is a matter of considerable importance especially when the latter is provided with inner-wall vanes as described. In order to fully utilize a considerable length of screen and reduce and distribute the wear and tear upon the screen wall, I provide the inlet conduit C with a lateral-delivery discharge-end 30 extending longitudinally into the screen and having an inclined overfall 31 (Fig. 2) the edge of which runs parallel with the screen wall; said overfall 31 connecting to the inwardly extended discharge-end 30 of the conduit wall above the bottom of the latter as shown so as to not only divert the flow laterally but to equalize its force and distribute it lengthwise of the screen. As shown the overfall 31 is directed toward the descending wall of the screen, thereby reducing the injurious effect of the first contact with the screening and at the same time utilizing the force of the flow, by its contact with the vanes, to assist in rotating the screen. A further practical advantage of thus delivering the inflowing stream results from the cleaning action of the liquid upon the screening, whereby the necessity for special cleaning heretofore provided for is greatly reduced.

The several features of my complete invention as shown and described coöperate in quickly and thoroughly effecting the separation and delivery of the non-fluid matter in sewage or the like, with a minimum cost of operation and maintenance of the apparatus employed, but they may obviously be utilized otherwise than specifically set forth without departing from my invention.

What I claim is—

1. A rotary screen for sewage or the like having a helical conveyer vane on its inner periphery, the inner edge of said vane being elevated in the direction of rotation above the radial line to form a carrier trough.

2. A rotary screen for sewage or the like having an open exit end with a baffle flange, a helical conveyer vane on its inner periphery terminating short of said flange, and a dumping receptacle fixed to said flange and having its inner edge elevated in the direction of rotation, in combination with a fixed delivery chute having its upper end adapted to directly receive the discharge from the rising receptacle.

3. A rotary screen for sewage or the like having a helical conveyer vane on its inner periphery the inner edge of which is elevated in the direction of rotation, in combination with a central inlet conduit to said screen having a lateral overfall extending therefrom toward the descending portion of the vaned screen wall.

4. A rotary screen comprising a skeleton frame made up of a series of circumferentially-spaced longitudinal ribs, and a series of longitudinally-spaced rings rigidly connected to said ribs and having their exterior faces flush with the exterior faces of said ribs, separate screening sections exteriorly laid upon said frame with the marginal portions thereof bearing upon said rings and ribs, and exterior clamping ring-sections and rib-sections separately bolted to said frame-rings and ribs to removably secure said netting sections.

In testimony whereof, I affix my signature, in the presence of two witnesses.

PETER L. SCHOLL.

Witnesses:
  D. M. STEWART,
  ADAM L. OTTERBEIN.